United States Patent [19]

Marantette et al.

[11] 3,716,716
[45] Feb. 13, 1973

[54] PHOTOELECTRIC TWO AXIS POSITIONING SYSTEM

[76] Inventors: William F. Marantette; Ruth B. Marantette, both of 20624 Earl St., Torrance, Calif.

[22] Filed: Aug. 26, 1971

[21] Appl. No.: 175,258

[52] U.S. Cl.....................250/203 R, 250/233, 83/71
[51] Int. Cl.................................................G01j 1/20
[58] Field of Search....250/202, 203 R, 203 CT, 233; 83/71, 365

[56] References Cited

UNITED STATES PATENTS

| | | | |
|---|---|---|---|
| 3,293,439 | 12/1966 | Marantette et al. | 250/203 R |
| 3,143,654 | 8/1964 | Aroyan et al. | 250/233 |
| 3,230,379 | 1/1966 | Aroyan et al. | 250/203 R |
| 2,967,247 | 1/1961 | Torck | 250/203 CT |
| 3,532,893 | 10/1970 | Marantette et al. | 250/202 X |
| 3,433,961 | 3/1969 | Pincus | 250/203 R |

*Primary Examiner*—Walter Stolwein
*Attorney*—Pastoriza & Kelly

[57] ABSTRACT

A member is capable of being positioned at precise rectangular coordinate points by providing a circular hole in the member. A light source is positioned on one side of the member and a photocell on the other side to receive light passing through the hole along a given axis corresponding precisely to the coordinate points. A slot is provided between the photocell and hole and extends radially from the given axis beyond the boundary of the hole. By revolving this slot about the said given axis, the photocell will then receive a constant amount of light through the slot for every revolved position only if the hole in the member is exactly centered on the given axis. Any off-centering of the hole from this given axis results in a variable amount of light passing to the photocell from the slot. The resulting variable electrical signal derived from the photocell is then used to actuate servo-motors to move the member in a proper direction to minimize the variations in the signal thereby effecting exact centering of the hole and thus the member at the precise coordinate points.

7 Claims, 5 Drawing Figures

PATENTED FEB 13 1973 3,716,716

PHOTOELECTRIC TWO AXIS POSITIONING SYSTEM

This invention relates broadly to a photoelectric two axis positioning system particularly useful for positioning a work in an X, Y coordinate plane in accordance with given coordinate points on a master control member such as a template or master art work in order that automatic machining operations can be carried out accurately.

BACKGROUND OF THE INVENTION

In our U.S. Pat. No. 3,293,439 issued Dec. 20, 1966 and entitled TWO AXIS PHOTOELECTRIC POSITIONING SYSTEM INCLUDING ALTERNATE AXIS ACTIVATION OF PHOTOCELL, there is described a photoelectric means for effecting positioning of a master template at precise rectangular coordinate points. Essentially, a photocell is provided on one side of the master template and a light source on the other, the master template including a hole which the light passes. Off-centering of the hole changes the light pattern on the photocell giving rise to signals which operate servomotors to move the master template in a proper direction to exactly center the hole relative to the light path. These movements also control a circuit board or other work through which a hole is to be drilled at a desired coordinate position.

While the system briefly described above operates satisfactorily, it is found that in utilizing the holes in a master template, there is often a variation in the size or diameter of the hole with the result that consistent operation cannot always be realized. Further, the master template may be defective such that light passes through a non-circular opening to strike the cell and such could operate the drilling mechanism thereby drilling a fast hole. Finally, for extremely large holes in the master template, off-centering of the hole cannot be as accurately detected as is desirable for precision operations.

BRIEF DESCRIPTION OF THE PRESENT INVENTION

With the foregoing considerations in mind, the present invention contemplates an improved photoelectric two axis positioning system wherein far greater accuracy in precisely centering a hole relative to fixed rectangular coordinates is realizable even though the hole itself may vary in diameter.

In accord with the invention, a member such as a master art work having a circular hole is positioned between a light source and a photocell, the path of light being on an axis normal to the member and passing precisely through the given coordinate points. A slot is provided between the photocell and the hole in the member, the slot extending radially from the given axis beyond the boundary of the hole. With this arrangement, it will be evident that by revolving the slot about the axis of the light path, the photocell will receive a constant amount of light for any revolved position of the slot only when the exact center of the hole in the member coincides with the axis of revolution. Any off-centering of the hole from the axis will result in a variable amount of light passing to the cell over a complete rotation thereby enabling a variable signal to be derived from the cell. This signal may be employed to operate servo-motors to move the member or master art work in a direction to minimize the variation in the signal and thereby assure an exact centering of the hole in the member at the given coordinate points.

The invention is preferably utilized with a circuit board drilling machine wherein the board is connected to the master art work for movement therewith. Suitable points on the circuit board to be drilled can then be precisely positioned by positioning corresponding holes in the master art work by means of the photocell and revolving slot arrangement. When used to control the drilling of a circuit board, the system also contemplates safety means for preventing drilling should the hole in the art work not be circular or should unwanted ambient light strike the cell or in some other unusual event.

BRIEF DESCRIPTION OF THE DRAWINGS

A better understanding of this invention will be had by referring to the accompanying drawings, in which.

DETAILED DESCRIPTION OF THE PREFERRED EMBODIMENT

Figure 1:
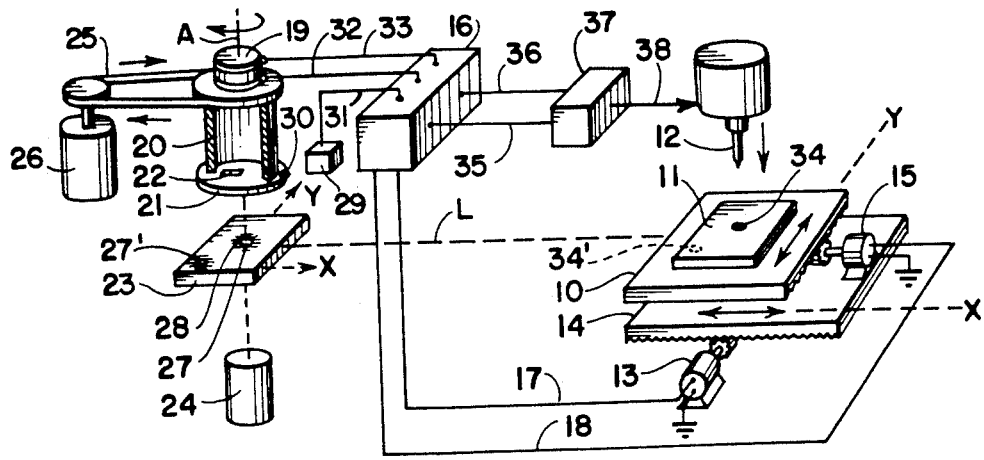
FIG. 1 is a schematic diagram illustrating the two axis positioning system of this invention as used to control the proper positioning of a circuit board through which holes are to be drilled at precise locations.

Referring to FIG. 1 there is shown a work table 10 carrying a board which might, for example, be a printed circuit board through which holes are to be drilled at various locations as by an automatic drill 12. The board 11 may be moved in X and Y coordinate directions as indicated by the double headed arrows by means of a servo-motor 13 arranged to move a first or base table 14 back and forth in the X direction and a servo-motor 15 carried on the base table 14 coupled to move the table 10 back and forth in a Y direction.

Signals to the servo-motors 13 and 15 are provided from a control circuit designated generally by the numerals 16 through leads 17 and 18 respectively. Thus a positive signal on the lead 17 will move the table 14, for example, to the right or in a positive X direction whereas a negative signal will move the table in a negative X direction or to the left. Similarly, positive and negative signals passed to the motor 15 will move the table 10 in a positive or negative Y direction. A zero voltage signal or absence of a signal will result in non-operation of the servo-motors thereby holding the tables and thus the board 11 in a fixed position relative to the drill 12.

The control circuit 16 is responsive to the output of a photocell 19. This photocell includes a housing or frame structure 20 carrying a disc 21 within which there is provided a slot 22. A member such as a film defining a master art work 23 is disposed below the photocell and a light source 24 is positioned on the other side or beneath the member 23. Means are provided to rotate the photocell and slot 22 very rapidly as by a pulley belt 25 and drive motor 26.

The member 23 which, as stated, may comprise a master art work defines a circular hole 27 surrounded by an opaque or darkened area 28. As indicated by the dashed line L, the circuit board 11 is connected to the master art work 23 so that the same will move in unison. Thus operation of the servo-motors 13 and 15 to move the board 11 will also result in simultaneous movements of the master art work in X and Y directions.

As shown in FIG. 1, the master art work 23 is initially positioned so that light from the source 24 will pass through the hole 27 and slot 22 to the photocell 19. The axis of rotation of the photocell and slot structure is designated A and is coincident with the light path from the light source 24. This axis defines a precise coordinate point on which it is desired to exactly center the hole 27. It will be noted that the slot 22 relative to this given axis of rotation A extends radially from the axis and as will be clearer as the description proceeds of a length to cross the boundary of the hole 27 when viewed along the axis A from above.

Still referring to FIG. 1, there is indicated by the block 29 a sensor positioned adjacent to the periphery of the disc 21. This disc carries a small metal slug 30 which will periodically pass the sensor 29 upon rotation of the housing structure 20 about the axis A. It is not necessary that this slug be located on the disc 21 within which the slot 22 is formed. Any rotating part of the structure could carry the slug with the sensor 29 positioned adjacent thereto to provide a signal each rotation of the photocell structure. This signal is passed through a lead 31 to the control circuit 16. Also, there is provided suitable brush leads 32 and 33 to pick up signals off suitable slip rings on the photocell 19 and pass the same to the control circuit 16 as shown.

Figure 2:
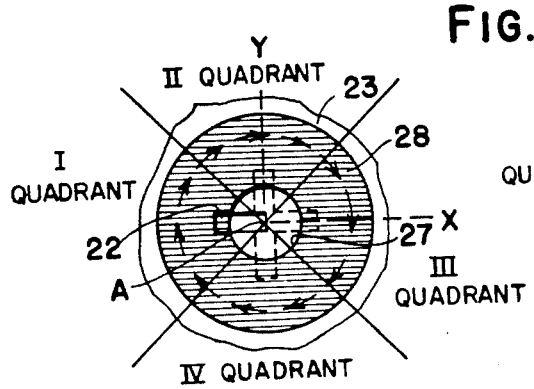
FIG. 2 is a plan view fragmentary in form of the hole in a master art work relative to certain components of the photoelectric system wherein the hole is precisely centered.

Referring now to FIG. 2, there is shown a fragmentary portion of the master art work 23 wherein the circular hole 27 is shown precisely centered with respect to the axis A of rotation of the photocell structure described in FIG. 1. The slot 22 is shown projected in solid lines as it would appear when the hole is precisely centered. It will be noted that this slot extends radially from the axis A and crosses the boundary of the hole 27. The circumferentially extending series of arrows indicate the rotation of the photocell about the axis A and successive positions of the slot 22 which revolves about this axis are indicated by the dotted lines.

It will be immediately evident from FIG. 2 that the amount of light passing through the hole 27 and the portion of the slot 22 which is not eclipsed by the area outside the boundary of the hole is precisely constant for any revolved position of the slot. Such is necessarily the case since the hole 27 is circular and the exact center of the hole coincides with the axis of revolution.

Under the above conditions, and dividing the revolving travel of the slot into four quadrants as indicated by the Roman numerals I, II, III and Iv, the light reaching the photocell of FIG. 1 will be the same in each quadrant.

Figure 3:
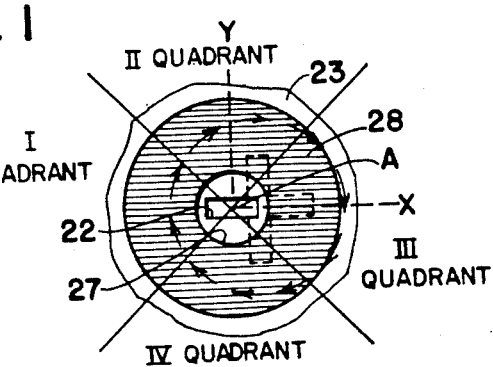
FIG. 3 is a view similar to FIG. 2 illustrating conditions when the hole is off-center.

Referring nor to FIG. 3, there is depicted the same situation as shown in FIG. 2 except the hole 27 is off-center from the axis A. Under these conditions, it will be clear that more light will be passed to the photocell while the slot is revolving through the quadrant 1 than when passing through the remaining quadrants. In other words, for any condition in which the hole is off-centered, the amount of light reaching the cell over a complete revolution of the slot will vary. In the particular example depicted in FIG. 3, the hole is off-center along the X axis to the left with the result that there is more light received when the slot passes through the first quadrant than is the case when the slot passes through the third quadrant. The amount of light passing to the cell when the slot moves through the second and fourth quadrants is the same.

In essence, the photoelectric cell 19 will provide a signal which is constant so long as the amount of light reaching the cell is constant over each revolution of the cell and which is variable if the light reaching the cell over each revolution is variable. Thus, whenever the hole 27 is off-center, there will be provided a variable signal from the photocell to the control circuit 16 of FIG. 1. This control circuit 16 together with the servomotors 13 and 15 function in response to such variable signal to move the table 10 and connected master art work 23 along the X or Y coordinates in a proper direction tending to minimize the variation in the electrical signal such that when the hole 27 is precisely centered there will no longer be a variable signal so that the servo-motors will stop and motion of the table and thus the master art work will cease. Since the master art work holes define precise coordinate positions corresponding to points on the board 11 to be drilled, after the board has stopped in a given position, a corresponding hole may be drilled in the board 11 as indicated at 34 in FIG. 1. After drilling, the motors 13 and 15 are energized to move the board 11 and thus the master art work generally to position the next hole such as 27' in the master art work 23 and a corresponding point 34' on the board 11 to be next drilled. Initial positioning of the next hole 27' on the master art work between the light source 24 and photocell 19 will permit light to pass though the hole to the photocell and then through the control system described, exact centering of this hole will be effected. Drilling can then take place to drill the next hole in the board 11.

In FIG. 1 there are shown leads 35 and 36 from the control circuit block 16 to safety means depicted by the block 37 connected to the drill as shown at 38. Essentially, and as will become clearer as the description proceeds, certain signals on the lines 35 and 36 will act on the circuit block 37 to prevent operation of the drill. Such signals are generated on the lines 35 and 36 in response to certain conditions which might otherwise cause operation of the drill resulting thereby in a false drill hole.

Figure 4:
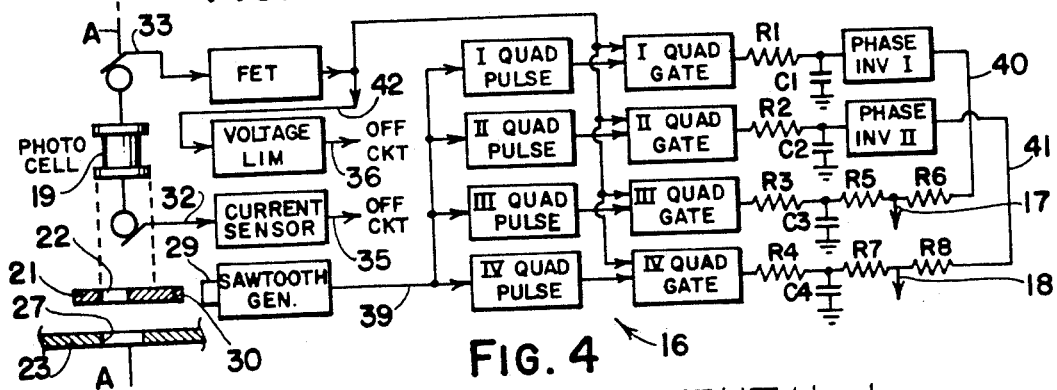
FIG. 4 is an electrical block diagram illustrating one means for utilizing generated signals for effecting an exact centering of the master art work.

Referring now to FIG. 4, one circuit control system which could be utilized in the block 16 for carrying out the various operations described is shown. In FIG. 4, components corresponding to those described in FIG. 1 are designated by the same numerals. Thus as schematically indicated, the photocell 19 is positioned along the axis A for receiving light passing up through the hole 27 and slot 22, the hole 27 being shown as off-centered to correspond to its position illustrated in FIG. 3. The photocell 19 is preferably a silicon diode of very high impedance and having a very fast response time. To reduce the output impedance so that the signal will not be lost, the cell output is first fed into a field effect transistor through the line 33 from the slip ring structure as indicated by the block FET. The block FET also includes a circuit to provide a variable load resistor (transistor) which maintains the d.c. level of the photocell output near zero regardless of the size of the master art work hole. The output from the block FET will therefore be a constant amplitude signal so long as the hole is precisely centered as described with respect to FIGS. 2 and 3. Any off-centering of the hole will result in a variation of the signal at the output on either side of a zero voltage level.

In the particular embodiment described, the photocell and slot structure are rotated about the axis A at a high speed which is maintained absolutely constant; for example, five thousand revolutions per minute. The slug insert 30 on the disc 21 passes the sensor block 29 once each revolution and serves to change the reluctance of a magnetic circuit in such a manner as to provide a trigger pulse each revolution. This trigger pulse serves a reset a sawtooth generator so that the output from the sawtooth generator on output line 39 is a repetitive sawtooth pattern having a period corresponding to one revolution of the photocell and slot.

Still referring to FIG. 4, the sawtooth output on lead 39 passes to four pulse circuits which are biased to provide an output pulse when their inputs attain a given voltage level. These four circuits are indicated by the blocks I quad pulse, II quad pulse, III quad pulse, and IV quad pulse. Essentially, there will be provided four sequential output pulses each revolution of the slot structure, the pulse from each pulse block comprising a stretch pulse having a duration corresponding to the time that the slot structure is passing through the designated quadrant.

The output pulses from the various quadrant pulse generators are passed respectively to four gating circuits designated by the blocks I quad gate, II quad gate, III quad gate and IV quad gate. Essentially, these pulses open the gates for a period of time during which the slot is traveling through the corresponding quadrant.

Also feeding into the gates is the output from the FET block which is derived from the output of the photocell.

The gated signals from the quad gates pass through resistances R1, R2, R3 and R4 to charge capacitors C1, C2 C3 and C4 with a voltage proportional to the signal occuring during the particular time that the slot passes through the corresponding quadrant. The voltages across the capacitors C1 and C2 corresponding to the signals developed while the slot is passing through the first and second quadrants are inverted as by phase inverter I and phase inverter II. The outputs from these phase inverters connect through line 40 and 41 to the ends of split resistance networks R5, R6 and R7, R8 respectively. The other ends of these resistance networks connect to the capacitors C3 and C4. Center tap points from these resistance networks constitute output signals passed to the lines 17 and 18 of FIG. 1 for the X and Y servo-motors respectively.

Figure 5:
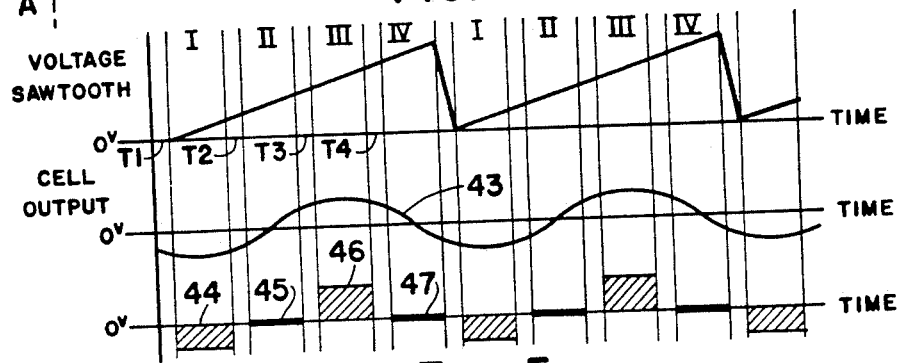
FIG. 5 illustrates a series of wave forms useful in explaining the operation of the system of FIG. 4.

Referring to FIG. 5, the foregoing circuit operations will be better understood. Thus, there is indicated in the top wave form, the output from the sawtooth generator on the line 39 passing to the various quad pulse circuits. As mentioned, the quad pulse circuits are biased to generate an output pulse for certain voltage levels occuring at the time T1, T2, T3 and T4 which correspond to the points in the time that the revolving slot starts to enter each of the quadrants I, II, III and IV.

Below the sawtooth there is depicted a wave form 43 which corresponds to the output of the photocell after passing through the FET circuit block. It will be noted that the signal 43 varies with time which results from the situation depicted in FIG. 3 wherein the hole 27 is off-center along the X axis. It will be evident that when the hole is exactly centered on the axis of revolution of the slot as shown in FIG. 2, the output signal 43 would be constant; that is, there will be no variations in this signal.

The gates essentially pass the average value of the signal 43 occuring in each of the quadrants to the capacitors C1 through C4 so that voltages are developed on these capacitors of negative and positive values or zero value as the case may be indicated by the levels 44, 45, 46 and 47 in FIG. 5. The negative voltage 44 on the capacitor C1 is inverted by the phase inverter I to a positive voltage is added through the resistances R5 and R6 to the positive voltage level 46 on the capacitor C3 thereby providing a high positive output voltage on the lead 17. The signal on the second capacitor C2 which in the example taken is zero volts is added to the signal on the capacitor C4 which is also zero volts or is of the same voltage as the capacitor C2 so that after inversion the net output on the line 18 is zero volts.

OPERATION

With all of the foregoing description of the drawings in mind, the operation of the system will be evident. If it is first assumed that the hole 27 is precisely centered on the axis of revolution for the photocell and slot as depicted in FIG. 2, it will be evident that the output signal from the photocell and from the block FET of FIG. 4 will be the same in all of the four quadrants. As a consequence, each of the gates will pass an identical voltage to each of the storage capacitors C1 through C4 of FIG. 4. Regardless of the value of this particular signal since it is the same on all of the capacitors, the signal on the capacitor C1 after inversion by the phase inverter when added to the signal on the capacitor C3 will precisely cancel this signal so that there will be zero output volts on the line 17 passing to the X axis servomotor 13. Similarly, when the signal on the capacitor C2 is inverted and added to the signal on the capacitor C4, since all of the signals are of the same value the output on the line 18 will be zero volts and thus the Y axis servo-control-motor 15 will not operate. The servo-motors with no signals being received therein will thus hold the board 11 and master art work in the precisely centered positions suitable for drilling.

If the hole in the master art work is off-center as depicted in FIG. 3, for example, there will be developed a positive signal on the output line 17 to the X axis servo-control-motor 13 as a consequence of the addition of the voltages as described. Since, the levels on the capacitors C2 and C4 are the same, there will not be any signal to the Y axis control servo 15. Operation of servo-motor 13 as a consequence of this positive voltage will move the table structure to the right as viewed in FIG. 1 thereby centering the hole 27. As the hole approaches it center position, the signals developed when the slot passes through the first and third quadrants will tend to equalize thereby gradually diminishing the positive signal passed to the servo-motor until this signal become zero. At this point, the motor will stop and the hole will be precisely centered. Any deviation of the hole in the direction of the Y axis will cause the Y axis servo-control-motor 15 to operate in the same manner.

Three safeguard circuits are provided to prevent false operation of the drill. For example, should the photocell 19 be operating in an area where the light to the photocell in unrestricted, the photocell current will exceed a given value when can be set by the current sensor block connecting to the line 32 from the lower slip ring shown in FIG. 4. This photocell current sensor provides a signal on its output line 35 to the control circuit 37 for the drill as described in FIG. 1 to render the drill inoperative. The situation, as mentioned, will only obtain should the photocell current exceed a given value.

A second and third safeguard are provided by monitoring the output signal from the FET circuit of FIG. 4. Thus a branch line 42 from the output of the FET is passed into a voltage limiter which may be set to provide an output signal on line 36 to render the drill inoperative should the output voltage signal exceed given positive and negative levels. For example, if no light is falling on the cell, the output voltage signal is such as to render the drill circuit inoperative. On the other hand, should the excursion of the signal; that is, the amplitude of a varying signal resulting from revolution of the slot fall outside a given set amplitude, the drill is also rendered inoperative. This latter situation might occur should a non-circular hole exist in the master template. Thus any false drilling of holes is prevented for unusual conditions of this type.

From the foregoing description, it will thus be seen that the present invention provides an improved two axis positioning system in which disadvantages encountered in prior art devices are overcome.

What is claimed is:

1. A method of positioning a member at precise rectangular coordinate points comprising the steps of:
   a. providing a circular hole in said member;
   b. providing a light source on one side of said member and a photocell on the other side;
   c. initially positioning said member such that said light source passes light through said hole to said photocell, the path of light being on an axis normal to said member and located at said precise coordinate points;
   d. providing a slot between said photocell and hole extending radially from said axis beyond the boundary of said hole;
   e. revolving said slot about said axis whereby said photocell receives a constant amount of light only when the exact center of said hole in said member coincides with said axis, any off-centering of said hole from said axis resulting in a variable amount of light passing to said cell to result in a variable electrical signal from said cell; and
   f. moving said member in response to said variable electrical signal in a direction to decrease the variations in said signal whereby when said hole is exactly centered on said axis, said electrical signal no longer varies and movement of said member ceases.

2. The method of claim 1, in which said member comprises a master art work having more than one hole, the holes being precisely positioned relative to each other, and including the step of providing a board to be drilled at points spaced relatively to each other in the same manner as the holes in said master art work, said board being connected to said master art work for movement therewith whereby said board is positionable at precise coordinate points defined by the hole positions in said master art work when said hole in said master art work is exactly centered.

3. A photoelectric two axis positioning system comprising, in combination:
   a. a master art work having a circular hole therein;
   b. a light source on one side of said art work and a photocell on the other side of said art work such that light passes through said hole from said light source to said photocell along a given axis normal to the plane of said art work;
   c. means defining a slot positioned between said art work and photocell such that only light passing through said slot from said hole reaches said photocell, said slot extending radially from said given axis and passing beyond the boundary of said hole;
   d. means for revolving said slot about said given axis whereby light from said slot reaching said photocell will be constant for every revolved position of said slot only if the exact center of said hole falls on said given axis, any off-centering of said hole from said given axis resulting in a variable amount of light reaching said photocell over each complete revolution of said slot;
   e. means connected to said photocell to provide a signal constituting a function of the amount of light received by said photocell at each instant of time, said signal being variable when said amount of light is variable and constant when said amount of light is constant; and
   f. servo-motor means for moving said master art work connected to be responsive to variations in said signal to move said art work in a direction to minimize the variations in said signal whereby when said art work is moved to exactly center said hole on said given axis, said signal becomes constant and said servo-motor stops.

4. A system according to claim 3, in which said master art work includes more than one hole, the holes being precisely positioned relative to each other; a board through which holes are to be drilled at points spaced relatively to each other in the same manner as said holes in said master art work, said board being connected to said master art work for movement therewith; and a stationary drill above said board, whereby said drill may be operated to drill a hole in said board after exact centering of a hole in said master art work has taken place thereby positioning said board for drilling at a precise corresponding point on said board.

5. A system according to claim 4, including safety means connected to receive said signal and responsive to said signal exceeding a given valve to render said drill inoperative.

6. A system according to claim 4, including safety means connected to receive said signal and responsive to variations exceeding a given amplitude to render said drill inoperative.

7. A system according to claim 4, including means for blocking any light from reaching said cell other than the light passing through said hole.

* * * * *